United States Patent Office 3,425,992
Patented Feb. 4, 1969

3,425,992
PROCESS FOR PRODUCING FORMALDE-
HYDE COPOLYMER HAVING EXCEL-
LENT DYEABILITY
Junnosuke Yamauchi, Tamotsu Eguchi, and Kanji
Matsubayashi, Kurashiki, Japan, assignors to
Kurashiki Rayon Co., Ltd., Kurashiki, Japan
No Drawing. Filed Aug. 9, 1965, Ser. No. 478,424
U.S. Cl. 260—67                                    10 Claims
Int. Cl. C08g 13/00, 51/66

ABSTRACT OF THE DISCLOSURE

Thermally stable and mechanically tough formaldehyde copolymer having excellent dyeability is obtained by reacting a formaldehyde copolymer having 0.1–10 mole percent of comonomer units containing halogen atoms with ammonia or amines to effect amination of said copolymer.

---

This invention relates to a process for producing a novel formaldehyde copolymer having excellent dyeability.

A typical formaldehyde copolymer known heretofore is formed of an oxymethylene unit and oxyalkylene unit, the component elements being carbon, oxygen and hydrogen. Such copolymer, having good thermal stability and mechanical properties, has attracted attention as an industrial plastics material. Fibers made from the copolymer have sufficient tenacity and elongation recovery to find possibilities in the fields of clothing and industrial fibers. However, formaldehyde copolymers hitherto made available have drawbacks, particularly poor dyeability. They merely take disperse dyes, and have insufficient fastness to washing. The disadvantages have seriously limited the uses of formaldehyde copolymers, and the poor dyeability in particular has practically barred the copolymers from applications as textile materials for clothing purposes.

The principal object of the invention is to provide a formaldehyde copolymer which can give readily dyeable, mechanically tough and thermally stable fibers, plastics, and films.

Another object of the invention is to obtain a highly dyeable formaldehyde copolymer readily at a high yield.

Further object of the invention is to obtain a formaldehyde copolymer which is alkali-proof and acid-proof.

Still further object of the invention is to provide fibers particularly adapted for making clothing.

Other objects and advantages of the present invention will become apparent from the descriptions given hereinbelow.

With a view to improving the dyeability of a formaldehyde copolymer composed of an oxyalkylene unit $$(-O(CH_2)_n-)$$

(wherein $n$ is an integer above 2) and an oxymethylene unit ($-OCH_2-$) (alkylene oxide content ranging from 0.5 to 10 molar percent), the inventors have studied the method of introducing amino groups which enable dye molecules to be easily adsorbed, that is, which are highly dyeable, into the side chains of a formaldehyde copolymer comprising an oxymethylene unit and oxyalkylene unit above mentioned.

At first, the inventors have attempted direct copolymerization of trioxane or formaldehyde with alkylene oxide having amino groups or cyclic formal having amino groups, but the attempts ended in failure. With further development of study, the inventors found that, by treating a starting material which is a formaldehyde copolymer having halogen in the side chains (hereinafter referred to as I-type copolymer), with amines, a novel highly dyeable formaldehyde copolymer having amino groups or substituted amino groups (hereinafter referred to as II-type copolymer) can be synthesized. This discovery has led to the present invention.

As the starting material, or I-type copolymer according to the invention, usually a copolymer having a molecular weight of more than 10,000 and which is prepared beforehand by copolymerizing a formaldehyde monomer, trioxane or tetraoxane with a comonomer containing halogen, is employed. In the present invention, halogen-containing comonomers include all the monomers which contain halogens and are copolymerizable with formaldehyde monomers, trioxane, or tetraoxane thereby to form a constituent in an amount of not less than 0.1 molar percent of the resulting copolymer, or which are graft and block copolymerizable with formaldehyde polymers and copolymers. The number of halogens to be contained in the comonomer must not always be one, but should be suitably selected from a range of one to four halogens, depending on the nature, cost factors, and the like of the desired copolymer. The halogen-containing comonomers useful in the invention are, for example, halogen-containing alkylene oxides such as epichlorohydrin, epibromohydrin, epiiodohydrin, $\beta$ - ethyl epichlorohydrin, and $\beta$-chloromethyl epichlorohydrin; halogen-containing cyclic ethers such as 3,3-bischloromethyl cyclooxabutane, 3,3-bisbromomethyl cyclooxabutane, and 3,3-bisiodomethyl cyclooxabutane; halogen-containing cyclic acetals such as 2-chloromethyl-1,3-dioxolane, 4-chloromethyl-1,3 - dioxolane, 4-bromomethyl-1,3-dioxolane, and 4 - iodomethyl-1,3-dioxolane; halogen-containing alkylvinyl ethers such as chloroethyl vinyl ether and bromoethyl vinyl ether; and, halogen-containing aldehydes such as chloral, monochloroacetaldehyde, and dichloroacetaldehyde.

The comonomer needs not always contain halogens of the same type, but may contain halogens of different types.

In the present invention, the halogen-containing copolymer may not only be a binary copolymer composed of a halogen-containing monomer and a formaldehyde monomer, trioxane, or tetraoxane, but may alternatively be a ternary or quaternary copolymer. The form of copolymerization may be either random or block polymerization. For example, the copolymer may be a ternary copolymer comprising trioxane, monochloroacetaldehyde, and ethylene oxide, or a quaternary copolymer of trioxane, parachlorobenzaldehyde, monochloroacetaldehyde, and 1,3-dioxolane, or a ternary copolymer of trioxane, monochloroacetaldehyde, and ethylene oxide, or a ternary copolymer of trioxane, dichloroacetaldehyde, and 4-chloromethyl-1,3-dioxolane. Graft copolymers obtained by graft copolymerization of formaldehyde copolymers with vinyl monomers containing halogens or dienic monomers containing halogens are also useful as starting materials for the method of the invention. They include, for example, graft copolymers prepared by graft copolymerization of formaldehyde-ethylene oxide copolymers with dichlorostyrene, or of trioxane-1,3-dioxolane copolymer with chloroprene and styrene.

Copolymer of formaldehyde or trioxane with a halogen-containing comonomer can be prepared by dissolving trioxane and a halogen-containing comonomer in a suitable solvent and then adding a catalyst to the solution thereby to carry out copolymerization, or by adding a halogen-containing comonomer to molten trioxane, or by introducing formaldehyde gas into a comonomer solution, or by adding a catalyst to a mixed solution of formaldehyde and a halogen-containing comonomer. Suitable solvents for use in the copolymization are substituted and unsubstituted aromatic hydrocarbons such as benzene, chlorobenzene, and nitrobenzene; alicyclic hydrocarbons such as cyclohexane, cyclopentane, cycloheptane, and cyclooctane; aliphatic hydrocarbons such as pentane, heptane, hexane, octane; and halogenated hydrocarbons such as chloroform, methylene chloride, and chlorobenzene. Suitable catalysts include Lewis acid or Brønsted acids such as $BF_3O(C_2H_5)_2$, $BF_3 \cdot OC_4H_8$, $BF_3O(C_4H_9)_2$, $BF_3$ gas, $SnCl_4$, $SnBr_4$, $HClO_4$, and $CH_3COClO_4$. The copolymerization usually takes more time than polymerization of trioxane or formaldehyde alone, over a broad range of from 5 minutes to 24 hours. The copolymerization temperature ranges from −80° C. to 100° C. Graft copolymers can be obtained by bringing a homopolymer of formaldehyde or trioxane or its copolymer with a cyclic ether or cyclic formal such as ethylene oxide, propylene oxide, or dioxolane, into contact with a radical polymerizable halogen-containing monomer, in the presence of a catalyst.

Some typical examples of copolymers having halogens in the side chains are given hereunder.

(1) Formaldehyde-epichlorohydrin copolymer: a copolymer composed of a (—OCH₂—) unit and

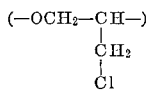

unit.

(2) Formaldehyde-acetaldehyde-epichlorohydrin copolymer: a copolymer composed of (—O—CH₂—),

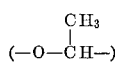

and

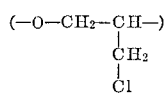

units.

(3) Formaldehyde-chloral-chloroethylvinyl ether copolymer: a copolymer composed of (—O—CH₂—),

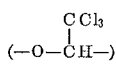

and

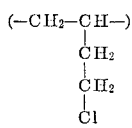

units.

II-type copolymers for use in the invention are prepared by amination reaction whereby a I-type copolymer is treated with a reagent for amination, e.g. ammonia, primary or secondary monoamine, diamine, or polyamine, and then the halogen or halogens in the copolymer are substituted by amino groups or substituted amino groups. The amination reaction is effected by heating a I-type copolymer in a reagent for amination, from a room temperature to 200° C., with stirring.

In general the yield of amination is high, well over 95%, but part of the halogen groups may be left unsubstituted when the end product is specifically required to be flame proof. The inventors have found that the formaldehyde copolymer thus aminated readily takes not only dispersed dyes but also other commercially available dyes such as direct dyes and acid dyes, has remarkable fastness to washing, and thus has broad possible applications.

A preferred process according to the invention for the manufacture of a II-type copolymer having excellent dyeability is formularized hereunder.

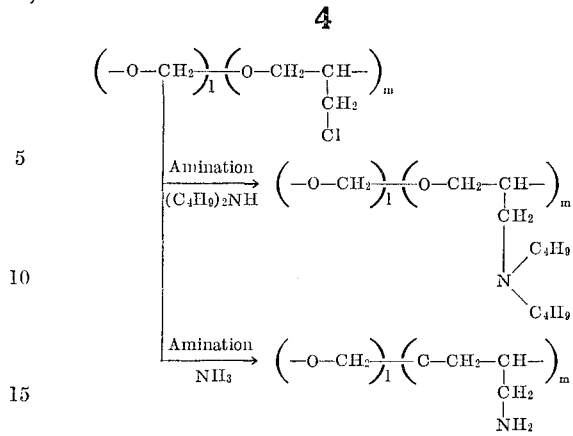

The method of the invention is epochal and much superior to other conventional methods in that it not merely provides II-type copolymers but also combines the following three distinctive advantages in the process of manufacture and in the quality of the product.

(1) Usually when a formaldehyde monomer, trioxane, or tetraoxane, and a haloegn-containing comonomer are copolymerized, the end parts of the resultant copolymer are constituted by thermally instable oxymethylene groups. To obtain a copolymer having good thermal stability, therefore, a procedure for removing the instable parts (hereinafter referred to as a purification treatment) is required. However, the present invention dispenses with the procedure for purification treatment, because the reaction of I-type copolymer with amine simultaneously effects amine substitution reaction for halogen and removal of the thermally instable part of the copolymer, and thus enables a formaldehyde copolymer having good dyeability and thermal stability to be manufactured without any purification treatment.

(2) Formaldehyde copolymers, e.g. I-type copolymers, generally have good alkali resistance but are inferior in acid resistance. On the contrary, II-type copolymers according to the invention have much better resistance to acids than ordinary I-type copolymers. The acid resistance is all the more enhanced because the amino groups in II-type copolymers catch free acids. The II-type copolymers need nor or little stabilizers such as antioxidants which are required by ordinary copolymers.

(3) The highly dyeable formaldehyde copolymer having amino groups or substituted amino groups contains hydrophilic groups in the form of amino groups in the polymers, and fibers made of the copolymer naturally have greater hygroscopicity than the ordinary formaldehyde copolymer composed of oxyalkylene and oxymethylene units, and thus have desirable properties as textile fibers for clothing.

Next, the technique and operation conditions involved in the process of the invention will be described.

In the invention, the term formaldehyde herein used includes, in addition to formaldehyde monomer, trioxane which is a cycle trimer of formaldehyde, and tetraoxane which is a cycle tetramer of formaldehyde.

Halogens in the halogen-containing I-type copolymers include fluorine, chlorine, bromine, and iodine, preferably chlorine and bromine. Carbons combined to halogen groups may be primary, secondary, or tertiary carbons, preferably primary carbons.

The content of halogen-containing comonomer in a halogen-containing I-type copolymer to be used as a starting material may be varied without limitations by changing the copolymerization conditions, but is preferably within a range of from 0.1 to 10 molar percent, because the comonomer content in the above range will not lower extremely the melting point and mechanical properties of the resulting II-type copolymer.

Amines for use in the invention include ammonia, primary and secondary amines, diamines, and polyamines of the general formula

(wherein $R_1$ and $R_2$ are radicals selected from the group consisting of hydrogen, alkyl, and cycoalkyl radicals having from one to 10 carbon atoms, and hydroxyalkyl, phenyl, and naphthyl radicals having from one to seven carbon atoms) or

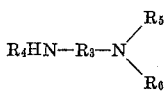

(wherein $R_3$ is a radical selected from the group consisting of alkylene, cycloalkylene, phenylene, and naphthylene having no carbon atom or from one to 10 carbon atoms, and $R_4$, $R_5$, and $R_6$ are radicals selected from the group consisting of hydrogen, and alkyl, cycloalkyl, and phenyl radicals having from one to six carbon atoms) or

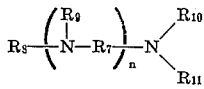

(wherein $R_7$ is a radical selected from the group consisting of alkylene, phenylene, and naphthylene having from one to 10 carbon atoms, and $R_8$, $R_9$, $R_{10}$, and $R_{11}$ are radicals selected from the group consisting of hydrogen, alkyl, cycloalkyl, and phenyl radicals having from one to six carbon atoms, though at least one of the class consisting of $R_8$, $R_9$, $R_{10}$, and $R_{11}$ must be hydrogen. $n$ denotes an integer between 2 and 6).

Definitely speaking, the amines include ammonia, butylamine, hexylamine, octylamine, decamethylamine, cyclohexylamine, benzlamine, p - methylbenzlamine, diethylamine, diisopropylamine, dibutylamine, butylpropylamine, diphenylamine, N-methylbenzylamine, monomethylaniline, ethanolamine, diethanolamine, N-methylethanolamine, N-ethylethanolamine, N-isopropylethanolamine, α-methyl-β-butylaminoethyl alcohol, 3-butylamino-1-propanol, N-butylaminoethanol, phenyl-α-naphthylamine, phenyl-β-naphthylamine, ethylenediamine, tetramethylenediamine, hexamethylenediamine, octamethylenediamine, decamethylenediamine, metaxylenediamine, metaphenylenediamine, N-cyclohexyl-ethylenediamine, N-dibutylethylenediamine, N-isopropyl-1,3-propanediamine, hydrazine, hydrazine hydrate, triethylenetetramine, and tetraethylenepentamine.

These amines may be used either singly or in mixture of two or more.

II-type copolymers can be prepared by bringing I-type copolymers into contact with the above amines. The contact is effected by adding an I-type copolymer into an amine or amines alone or into a suitable solvent containing an amine or amines, with stirring. The suitable solvent is neutral or basic, not injurious to polymers, capable of dissolving or dispersing amines, and have a polarity in terms of dielectric constant of more than 10 at 25° C. It may be, for example, water, an alcohol having from one to 10 carbon atoms, dimethyl-formamide, dimethylacetamine, dimethyl sulfoxide, nitrobenzene, or cyclohexanone.

In order to catch and neutralize liberated hydrogen halide with amino group and to prevent decomposition of the polymer by hydrogen halide, the amines must be used in excess to the amount of halogen in mole ratio. More exactly, the amount is preferably more than two times the equivalent of the required amount to the amount of halogen to be substituted in the I-type copolymer. The upper limit of the amount is governed by the required properties of the resulting copolymer, for example flame proofing quality, and also by economic factors. Most preferably, the amines are used in an amount from 10 times to 150 times the equivalent to the amount of halogen to be substituted.

The amination reaction is operated at a temperature between the room temperature and 200° C., preferably between 90° C. and 160° C. The time required to carry out the reaction depends on the reaction temperature and type of amine to be used, over a range of from 20 minutes to 5 hours. While it is not essential to use a catalyst, it may add to the effect of the invention, as the case may be, to employ a catalyst selected from the group consisting of tertiary amines such as tributylamine, triethylamine, pyridine, and triethanolamine, and inorganic alkalis such as sodium hydroxide, potassium hydroxide, lithium hydroxide, sodium carbonate, potassium carbonate, sodium bicarbonate, and potassium bicarbonate.

The I-type copolymer to be subjected to amination reaction may take any suitable form; a powder, film, molding, fiber, or the like. It may or may not be freed from the instable part.

In order to improve the stability of the copolymer obtained as an end product in accordance with the invention, it is advisable to add known antioxidants, stabilizers to heat and light, etc. to the copolymer thereby to enhance the thermal stability of the copolymer in the molten state and to increase the stability of moldings or fibers. Those mentioned hereunder are particularly effective stabilizers to be used as additives in the method of the invention.

(1) Useful antioxidants are primary, secondary, tertiary amines and phenol derivatives, which are added preferably in an amount of from 0.01 to 10% by weight. The effective amine compounds include N,N,N',N',-monohydroxy-alkyl-alkylene diamine, diphenylamine, and phenyl-β-naphthylamine. The phenol derivatives include phenols of the formula

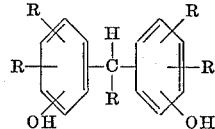

(wherein R denotes an alkyl radical), hydroquinone derivatives, β-naphthol derivatives, and bisphenol derivatives.

(2) Useful thermal stabilizers are nitrogen-containing high polymers such as polyamides, polyamide terpolymers, polyurethane, polyureas, polyvinyl pyrrolidone, and poly-arcylamide; hydrazines (including substituted hydrazones and hydrazides); ureas; the thioureas. Also available for the purpose are mercaptothiazoles of the formula

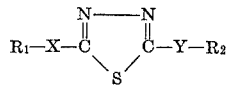

(wherein $R_1$ and $R_2$ denote hydrogen or alkyl radicals, and X and Y, sulfur or sulfonyl radicals), sulfonamides of the formula $R—(SO_2NH_2)_n$ (wherein $n$ denotes an integer between 2 and 4, and R, an alkyl radical), and sulfur compounds of the formula $R—S—R'$, $R—(S)_n—R'$ (wherein R and R' denote alkyl radicals) or following formula

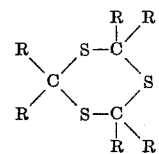

(wherein R denotes alkyl radical). The thermal stabilizer is advantageously used in an amount of from 0.01 to 10% of the total amount of the polymer.

(3) Light stabilizers include orthohydroxybenzophenone of the formula

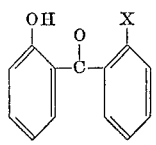

(wherein X denotes hydrogen or hydroxyl radical), alkylsalicylate derivatives, and pulverous carbon black. The stabilizer is added in an amount of from 0.01 to 3% to the polymer.

The invention is illustrated by the following examples, wherein the terms dye or fiber, exhaustion, and fastness to washing, are defined as hereinunder:

$$\text{Dye on fiber} = \frac{\text{Dye adsorbed on fiber}}{\text{Fiber}} \text{(mg./g.)}$$

$$\text{Exhaustion} = \frac{\text{Dye on fiber}}{\text{Amt. of dye used (mg./g.)}} \times 100 \ (\%)$$

Fastness to washing =
$$\frac{\text{Amt. of dye washed off (mg./g.)}}{\text{Dye on fiber (mg./g.)}} \times 100 \ (\%)$$

Washing condition: an aqueous solution of an anion active agent (sodium alkylbenzene sulfonate) (3 g./lit.) was added to dyed fiber, at a ratio of 50 ml. per gram of the fiber, and heated at 60° C. for 30 minutes.

Unless otherwise specified, all the parts in the examples are by weight.

Example 1

Fifty parts of purified trioxane, 5 parts of epichlorohydrin, and 50 parts of cyclohexane were placed in a large test tube. After the addition of 0.2 part of boron trifluoride ethyl etherate ($BF_3OEt_2$), the tube was sealed, and copolymerization was carried out at 60° C. for 4 hours. The polymer thus formed was thoroughly washed with methanol. Upon drying in vacuo at room temperature overnight, the resultant gave 48 parts of a white powdery copolymer, which was found by elementary analysis to contain 1.8 molar percent of epichlorohydrin unit.

Two parts of the pulverous copolymer were added to 20 parts of dimethylformamide containing 0.2 part of dibutylamine, and the mixture was allowed to react at 155° C. for 2 hours. The pulverous copolymer dissolved in 10 minutes, and the reaction proceeded in a homogeneous system. After two hours, the mixture was allowed to cool, when first a polymer was precipitated and then the whole was solidified. The powdery copolymer thus obtained was thoroughly washed with methanol and dried in vacuo at 60° C. overnight. 1.72 parts of a copolymer, having a melting point of 165° C. to 167° C., were obtained. Upon elementary analysis of the polymer following the above treatment, it was found that the polymer contains substantially no chlorine because the halogen was substituted by amino groups. In a test for dyeability of the copolymer treated wih dibutylamine, 1.0 part of the pulverous copolymer was introduced into 50 ml. of an aqueous solution containing 0.4 g./lit. of an acid dye, Acid Brilliant Scarlet 3R (C.I. 16255), 2.0 g./lit. of sodium sulfite anhydride, and 0.4 g./lit. of sulfuric acid, and was dyed at 90° C. for 2 hours. The copolymer was thoroughly dyed in deep red. The dye on fiber was 18.5 mg./g. and the exhaustion was 92.5%. The fastness to washing was as high as 2.5% in terms of the percentage of dye removal after treatment of the dyed copolymer with an aqueous solution containing 3 g./lit. of an anion active agent (sodium alkylbenzenesulfonate), in an amount 50 times greater than the amount of the copolymer, at 60° C. for 30 minutes. Meanwhile, trioxane and 1,3-dioxolane were copolymerized using $BF_3OEt_2$ as the catalyst. When the copolymer containing 1.8 molar percent of the 1,3-dioxolane unit was tested for dyeability in the manner as above described, it was dyed so poorly that the resultant appeared as though polluted with the dye. The dye on fiber was 0.5 mg./g., the exhaustion was 2.5%, and the fastness to washing was 20%.

Examples 2 to 5

The pulverous copolymer of trioxane and epichlorohydrin obtained by following the procedure described in Example 1 was reacted with various amines by using dimethyl formamide as the solvent, under the same conditions as in Example 1. The dye on fiber, and the values of fastness to washing of the copolymers thus obtained with improved dyeability were as given in the following table.

| Example | Amine Compound | Amount (percent/copolymer) | Dye on fiber (mg./g.) | Exhaustion (percent) | Fastness to washing (percent) |
|---|---|---|---|---|---|
| 2 | Ethylene-diamine | 10 | 18.1 | 90.5 | 2.1 |
| 3 | Triethylene tetramine | 15 | 18.6 | 93.0 | 2.0 |
| 4 | Aniline | 10 | 17.5 | 87.5 | 3.5 |
| 5 | Ammonia | 10 | 18.0 | 90.0 | 2.6 |

Example 6

Ten parts of 4-chloromethyl-1,3-dioxolane and 200 parts of n-hexane containing 0.2 part of tin tetrachloride were kept at 40° C., while purified formaldehyde gas was introduced into the mixture at a rate of 30 parts per hour, over a period of 2 hours, thereby to carry out copolymerization. Following filtration of the slurry formed, the pulverous polymer was thoroughly washed with methanol, and dried in vacuo at room temperature overnight. 63 parts of a dry copolymer were obtained. The powder was placed in 630 parts of benzyl alcohol containing 0.5% of tributylamine, and heated at 160° C. for 30 minutes, and unstable parts were thereby removed therefrom. 56 parts of a thermally stable copolymer having a melting point of 167° C. and a chlorine content of 1.9% resulted. To this purified copolymer, 0.5% of 4,4'-butylidene bis(3-methyl-6-tert.butylphenol) and 1% of polyurethane prepared by polyaddition of tetramethylene diisocyanate and hexamethylene glycol were added as stabilizers, and the mixture was subjected to melt spinning at 190° C. The fiber thus obtained was hot drawn by 300% at 140° C., thereby to form a 2-denier filament. Five parts of this filament were dipped in an aqueous solution containing 0.5 part of ethylenediamine, and heated at 90° C. for 3 hours. Upon cooling, the fiber was taken out, thoroughly washed with water, and dried in vacuo at 60° C. overnight. Two parts of the dried fiber were dipped in 100 ml. of an aqueous solution containing 0.4 g./lit. of Congo Red (C.I. 22120) and 20 g./lit. of sodium sulfate, and dyed at 100° C. for 2 hours. It was dyed in deep red, in a satisfactory manner with the dye on the fiber amounting to 18.4 mg./g., with an exhaustion of 92% and fastness to washing of 2.0%.

Example 7

Into a mixed solution consisting of 5 parts of 2-chloromethyl-1,3-dioxolane, 0.1 part of tin tetrachloride, and 100 parts of n-hexane kept at 40° C., purified formaldehyde gas was introduced at a rate of 15 parts per hour, over a period of one hour, thereby to carry out copolymerization. The slurry formed was filtered and the pulverous polymer was thoroughly washed with methanol and dried in vacuo at room temperature overnight. 15.8 parts of a dry copolymer having a chlorine content of 1.5% were obtained. Five parts of this copolymer were placed in 50 parts of benzyl alcohol containing 0.5 part of dibutylamine, and reacted at 160° C. for 2 hours. After cooling, the copolymer was thoroughly washed with methanol and water, and dried in vacuo at 60° C. overnight, when 3.5 parts of a dry copolymer, M.P. 162° C., were obtained. This copolymer was tested for its dyeability with an acid dye, Acid Brilliant Scarlet 3R (C.I. 16255) under the same conditions as in Example 1, and was found to be dyed satisfactorily with the dye on fiber of 17.8 mg./g., and with exhaustion of 89% and fastness to washing of 3.5%.

Example 8

To one part of the pulverous trioxaneepichlorohydrin copolymer obtained by the procedure of Example 1, 20 parts of ethanolamine were added, and the mixture was allowed to react at 160° C. for 2 hours. The reaction was apparently homogeneous. On completion of the reaction, the resultant was allowed to stand for cooling, and the separated precipitate was thoroughly washed with methanol, water, and acetone, and dried.

As a result, 0.86 part of an aminated copolymer was obtained. When tested for dyeability by the same procedure as described in Example 1, the pulverous aminated copolymer showed high dyeability with a dye-on-fiber of 20 mg./g., exhaustion of 100%, fastness to washing of 1.5%.

Example 9

An amination reaction was performed under the same conditions as described in Example 8 except that diethanolamine was used in lieu of ethanolamine, when a highly dyeable aminated copolymer was obtained with a dye-on-fiber of 20 mg./g., exhaustion of 100%, fastness to washing of 1.8%. The polymer recovery in amination reaction was 85.5%.

What we claim is:

1. A process for producing a formaldehyde copolymer having excellent dyeability which comprises reacting a formaldehyde copolymer having a molecular weight of at least 10,000 and containing from 0.1 to 10 molar percent of a halogen containing comonomer with a substance selected from the group consisting of compounds of the formulas (1)

wherein $R_1$ and $R_2$ are radicals selected from the group consisting of hydrogen, alkyl, and cycloalkyl radicals having from 1 to 10 carbon atoms, and hydroxyalkyl, phenyl, and naphthyl radicals having from 1 to 7 carbon atoms (2)
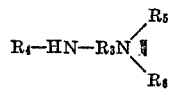

wherein $R_3$ is a radical selected from the group consisting of alkylene, cycloalkylene, phenylene, and naphthylene having less than 10 carbon atoms, and $R_4$, $R_5$ and $R_6$ are radicals selected from the group consisting of hydrogen, and alkyl, cycloalkyl, and phenyl radicals having from one to 6 carbon atoms, and (3)
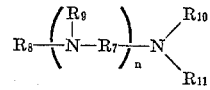

wherein $R_7$ is a radical selected from the group consisting of alkylene, phenylene, and naphthylene having from 1 to 10 carbon atoms, and $R_8$, $R_9$, $R_{10}$, and $R_{11}$ are radicals selected from the group consisting of hydrogen, alkyl, cycloalkyl, and phenyl radicals having from one to 6 carbon atoms, though at least one of the group consisting of $R_8$, $R_9$, $R_{10}$, and $R_{11}$ must be hydrogen; and $n$ denotes an integer between 2 and 6, at a temperature ranging from 90° C. to 200° C., to effect amination reaction of said copolymer in which halogen atoms in said copolymer are substituted by said substance.

2. Process as claimed in claim 1 wherein the amine is dibutylamine.

3. Process as claimed in claim 1 wherein the amine is ethanolamine.

4. Process as claimed in claim 1 wherein the amine is diethanolamine.

5. Process as claimed in claim 1 wherein the amine is ethylenediamine.

6. Process as claimed in claim 1 wherein the amine is hexamethylenediamine.

7. Process as claimed in claim 1 wherein the amine is triethylene tetramine.

8. Process as claimed in claim 1 wherein the formaldehyde copolymer is prepared from trioxane and epichlorohydrin.

9. Process as claimed in claim 1 wherein the formaldehyde copolymer is prepared from formaldehyde and 4-chloromethyl-1,3-dioxolane.

10. Process as claimed in claim 1 wherein the formaldehyde copolymer is prepared from formaldehyde, acetaldehyde and epichlorohydrin.

References Cited

UNITED STATES PATENTS

| 2,989,509 | 6/1961 | Hudgin et al. | 260—67 |
| 3,072,609 | 1/1963 | Berardinelli et al. | 260—67 |
| 3,250,746 | 5/1966 | Letort et al. | 260—67 |
| 3,272,780 | 9/1966 | Wilson et al. | 260—67 |
| 3,318,848 | 5/1967 | Clarke et al. | 260—67 |

F. D. ANDERSON, *Primary Examiner.*

L. M. PAYNES, *Assistant Examiner.*

U.S. Cl. X.R.

8—55, 115.5; 260—45.8, 45.9, 45.95, 73, 857, 858, 874, 884, 886, 895